Patented Dec. 26, 1933

1,941,262

UNITED STATES PATENT OFFICE 1,941,262

CELLULOSE ACETATE COMPOSITION

Russell L. Jenkins, Anniston, Ala., assignor to Swann Research, Incorporated, a corporation of Alabama No Drawing. Application December 16, 1931
Serial No. 581,529

18 Claims. (Cl. 106—40)

This invention relates to a new composition of matter and method of making the same in which cellulose acetate is mixed or compounded with other substances so that the resulting product can be used to advantage in the plastic and analogous arts, such for instance as sheet or film manufacture or lacquer manufacture.

One object of my invention is to provide a composition of matter the inflammability of which is reduced to a very considerable extent, thus making it relatively safe in use. Another object is to provide an improved water-resistant coating such as will not be attacked by solutions of photographic or other chemicals, and which is capable of being produced in strong flexible transparent films for photographic transparent coatings or other purposes.

A still further object is to provide a cellulose acetate composition more effectively plasticized than is possible by the use of other common plasticizers.

Previously known compositions of cellulose acetate have contained chlorinated naphthalene, or its homologues, which are, however, much less effective as a flame retarder or as a plasticizer and water-proofer than may be obtained utilizing my invention.

I have discovered that chlorinated diaryls which may be referred to as phenyl substituted benzenes, such as chlorinated diphenyl, or its homologues, particularly the chlorinated diphenyl benzenes, may be incorporated with cellulose ester, such as cellulose acetate, and products obtained which show effective flame retardation and water resistance. By my use of the term diaryl, I desire to include those compounds which are truly aromatic in character and structurally related to diphenyl and hence I exclude by this term substances such as naphthalene or its homologues.

In the practice of my invention, I select the more highly chlorinated diaryl bodies for this purpose since they are less volatile and exhibit more effective flame-proofing properties. As an example of the chlorinated diaryl bodies, which I prefer to use, I mention the chlorinated diphenyl containing at least 30 or 40 percent of chlorine. Such a body may be produced by chlorinating diphenyl to the required degree, after which the product is distilled. I may, of course, chlorinate to a further degree, say to 60 or 65% chlorine content, and thus obtain more viscous bodies. I may also chlorinate a mixture of diphenyl and the diphenyl benzenes to varying degrees, and thus obtain bodies having, at an equivalent chlorine content, somewhat higher viscosities than the chlorinated diphenyls alone. My present invention contemplates the use of bodies of this nature, either directly as obtained on chlorination, or after having been distilled.

By way of successfully incorporating chlorinated diaryls, such as chlorinated diphenyls or chlorinated homologues of diphenyl in cellulose acetate compositions, it is desirable to use a mutual solvent. Such solvent may be either a pure compound or a mixture of several of such substances as acetone, ethyl acetate, ethyl alcohol, ethyl lactate, or ethylene dichloride.

I may also employ in my new compositions one, or several, of the known plasticizers, such as Lindol (tricresyl phosphate); dibutyl phthalate; Santicizer (a partially ethylated toluenesulfonamide) or other similar materials, and thus obtain increased compatibility with cellulose acetate.

In order that others may practise my invention, I give the following specific details for producing my new composition:—

Solvent

A satisfactory solvent for compounding may be as follows:—

| | Grams |
|---|---|
| Ethylene dichloride | 2,000 |
| Ethyl alcohol | 500 |

Chlorinated diaryl

The chlorinated diaryls, which I may use, are considered to embrace not only chlorinated diphenyl but also the chlorinated diphenyl benzenes. The diphenyl benzenes are a group of substituted diaryl bodies formed during the thermal synthesis of diphenyl from benzol and may be separated as a body from the diphenyl by distillation. For the purpose of producing chlorinated diaryls suitable for my herein described composition I may chlorinate either the diphenyl alone to a suitable chlorine content, or I may mix with said diphenyl various proportions of the diphenyl benzenes and then chlorinate the mixture. If desired the diphenyl benzenes alone may be chlorinated to supply the diaryl body used in my composition. The use of such diphenyl benzenes alone or in appreciable proportion with diphenyl produces a chlorinated diaryl body which is considerably more viscous at an equivalent chlorine content than when employing only diphenyl, and may therefore be employed to produce harder plastic bodies. In my use of the term chlorinated diaryl I therefore include chlorinated diphenyl alone or associated in any proportion with chlorinated diphenyl benzenes, or even the latter compounds alone. Such chlorinated bodies may be obtained as light colored oils or resins by distillation.

For the purpose of this illustration I employ a chlorinated diphenyl of say 54 to 55% chlorine content which has been prepared by chlorinating diphenyl to this chlorine content using say iron as a catalyst, after which distillation yields a light colored viscous oil. Produced in this way, this body has a viscosity of from 45 to 50 seconds Saybolt and a specific gravity of 1.52 to 1.53 at 65°/65° C. This material is now dissolved in the above solvent so that 1 c. c. of the solution will contain 0.1 gram of the above chlorinated diphenyl.

*Cellulose acetate*

There are various grades of cellulose acetate on the market. Although the acetyl content of these acetates will vary, I prefer, in this specific example, to use one containing 41.4 percent of acetyl. If this grade of cellulose acetate is dissolved in acetone to form a 20 percent solution, the viscosity of the solution will be in the neighborhood of six seconds.

For the purpose of this illustration, dissolve the above grade of cellulose acetate in the mixed solvent mentioned above so that each cubic centimeter of the solution will contain 0.1 gram of the acetate.

*Plasticizer*

In the solvent mentioned above dissolve sufficient Santicizer 8 to give a solution containing 0.1 gram of the above plasticizer to each cubic centimeter of solution.

*Formulation of a lacquer*

Mix together 70 parts by volume of the cellulose acetate solution, 10 parts by volume of the Santicizer solution, and 20 parts by volume of the chlorinated diphenyl solution. This mixture will therefore consist of a total of 100 parts of a lacquer containing 10% by weight of non-volatile constituents. Such a clear lacquer may be applied by dipping, brushing, or spraying to metal or wood objects, or it may be pigmented and applied in like manner.

I may, of course, increase the non-volatile content of my lacquer by using more concentrated solutions in its formulation. Such a procedure will somewhat increase the viscosity, which may be desirable for certain applications. As has already been pointed out, considerable variation exists among the grades of cellulose acetate on the market. This variation is principally manifested by the viscosity and also the solubility exhibited by these various products when dissolved in the usual solvents. Accordingly some consideration should be given to the particular grade employed since the properties of the formulated composition will largely depend on the grade of acetate utilized.

*Plastic compositions*

The production of sheet or film may also be carried out using my improved compositions. For this purpose the solution should be sufficiently thick and viscous to be flowed during manufacture. By increasing the amount of non-volatile in the above described composition, or by varying somewhat the grade of cellulose acetate, a suitable product will be obtained. A composition suitable for this purpose may contain 80 to 90 parts of acetone, or the same volume of a mixture of alcohol and ethylene dichloride mentioned above may be used, together with 20 to 30 parts of acetone soluble cellulose acetate, and 5 to 6 parts of a chlorinated diphenyl of say 54% chlorine content.

Having now particularly described my invention, what I claim is:—

1. A plastic composition containing cellulose acetate and chlorinated phenyl substituted benzenes.

2. A plastic composition containing cellulose acetate and a chlorinated diphenyl.

3. A plastic coating composition containing cellulose acetate, chlorinated phenyl substituted benzenes, and a plasticizing body.

4. A plastic coating composition containing cellulose acetate and a chlorinated diphenyl, said chlorinated diphenyl having a chlorine content between 30 and 65 percent.

5. A sheet material coated with a durable fire-retarding film, said film containing cellulose acetate and chlorinated phenyl substituted benzenes.

6. A sheet material coated with a durable protective film, said film containing cellulose acetate and a chlorinated diphenyl.

7. A sheet material coated with a durable protective water retarding film, said film containing cellulose acetate, and a chlorinated diphenyl of more than 30 and less than 65% chlorine content.

8. A sheet material coated with a durable protective water retarding film, said film containing cellulose acetate, a chlorinated diphenyl of more than 30 and less than 65% chlorine content and a plasticizing body.

9. A sheet material coated with a durable protective water retarding film, said film containing cellulose acetate, a chlorinated diphenyl of more than 30 and less than 65% chlorine content and a partially ethylated toluenesulfonamid.

10. A plastic flowable coating composition comprising a cellulose acetate, a chlorinated diphenyl, a plasticizer and a solvent.

11. A plastic flowable coating composition comprising cellulose acetate of such an acetyl content that a 20% solution of said cellulose acetate in acetone will result in a solution having a viscosity in the neighborhood of six seconds, together with a chlorinated diphenyl, a plasticizer and a solvent.

12. A plastic flowable coating composition comprising cellulose acetate, a chlorinated diphenyl and a toluenesulfonamide plasticizer.

13. A plastic flowable coating composition comprising cellulose acetate, a chlorinated phenyl substituted benzene, a toluene sulfonamide plasticizer and a solvent.

14. A composition comprising cellulose acetate and chlorinated diphenyl.

15. A lacquer composition comprising cellulose acetate and a chlorinated diphenyl of at least 30% chlorine content.

16. A flowable coating composition comprising cellulose acetate and chlorinated diphenyl.

17. A flowable coating composition comprising acetone-soluble cellulose acetate and the resinous product obtained by chlorinating a mixture of diphenyl and other phenyl substituted benzenes.

18. A coating composition comprising cellulose acetate and a light-colored resin obtained by chlorinating diphenyl to more than 30% chlorine content.

RUSSELL L. JENKINS.